Dec. 22, 1931.  H. H. McKEE ET AL  1,837,625
VENDING DEVICE
Filed Aug. 22, 1929   2 Sheets-Sheet 1
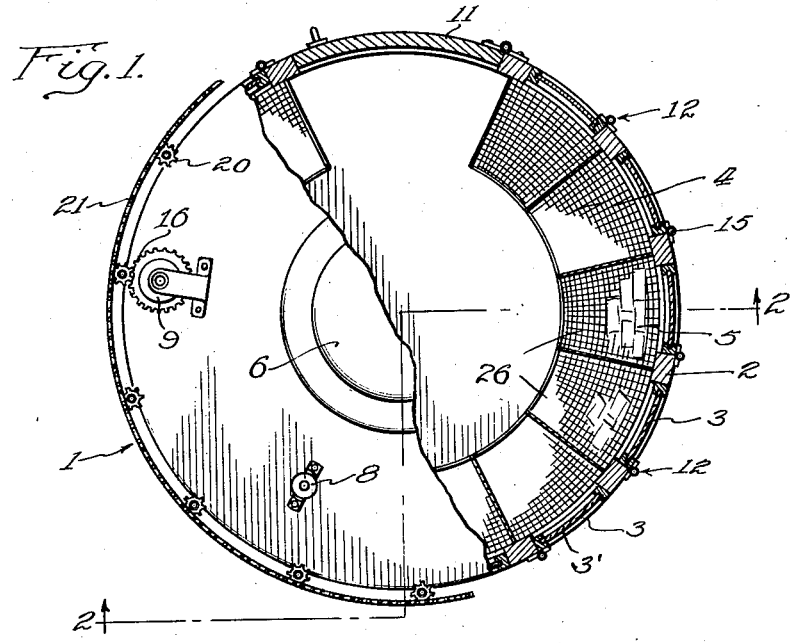
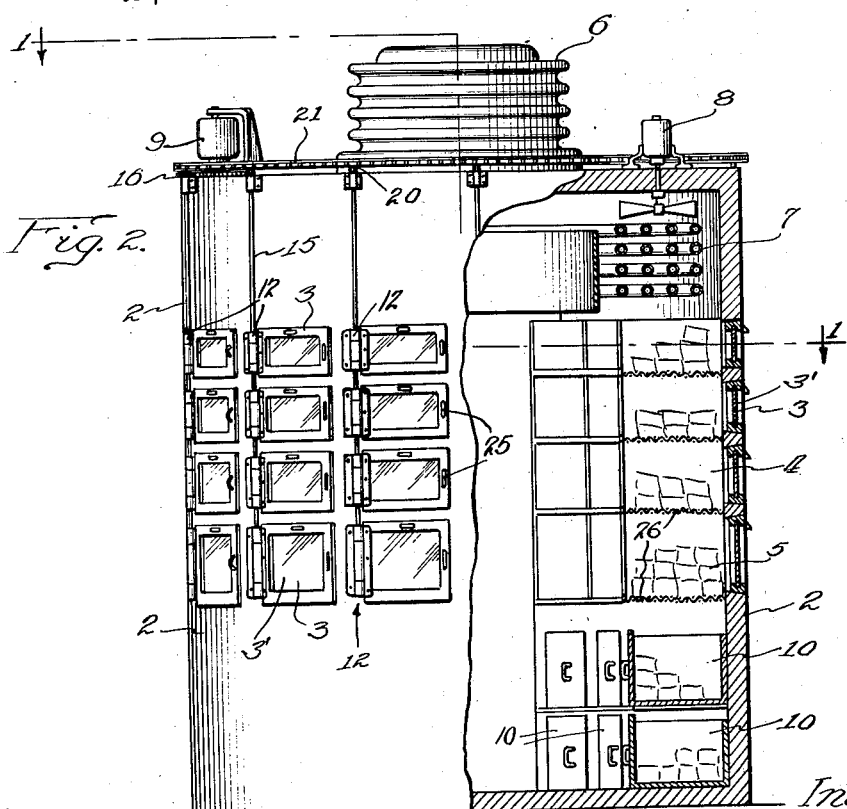
Witnesses
Arthur M. Framke.
Robert E. Harris.
Inventors
Harry Henry McKee.
Charles Taylor Walter.
By Kummler & Kummler, Attys.

Dec. 22, 1931.  H. H. McKEE ET AL  1,837,625
VENDING DEVICE
Filed Aug. 22, 1929   2 Sheets-Sheet 2
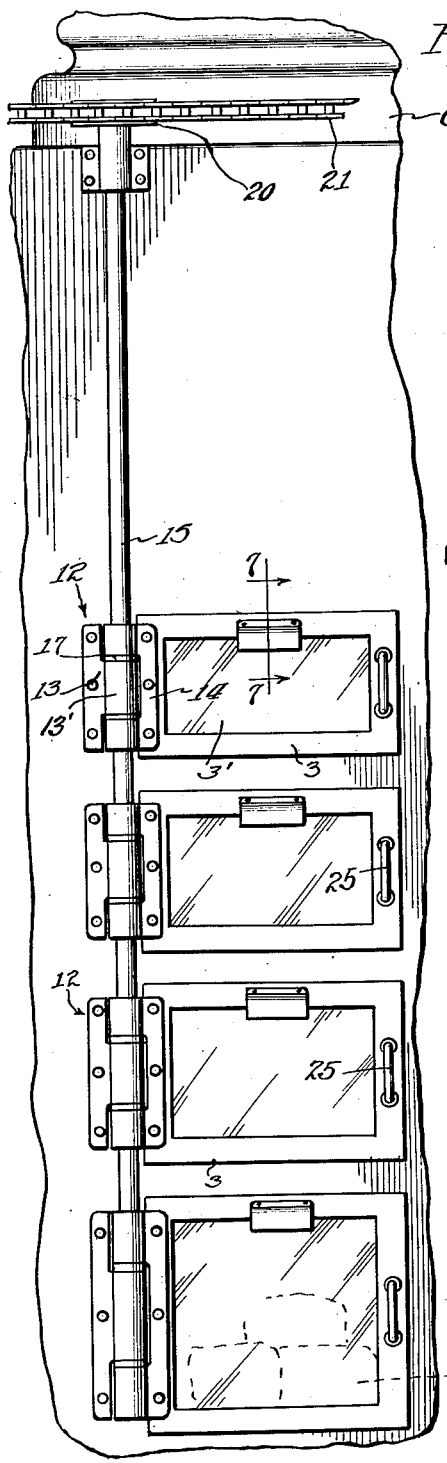
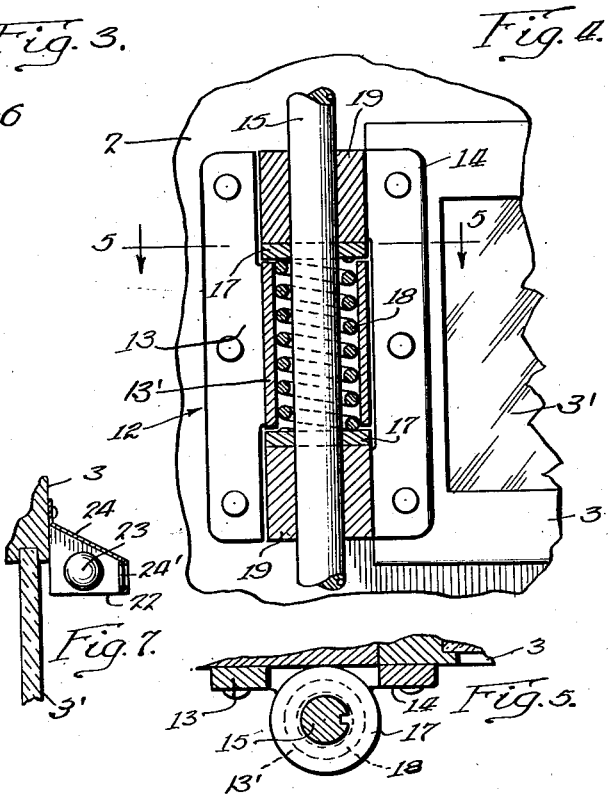
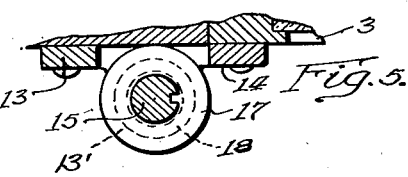
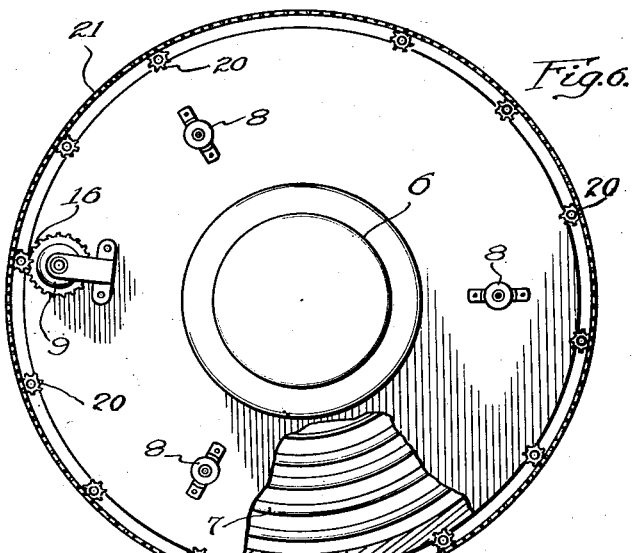
Inventors
Harry Henry McKee.
Charles Taylor Walter.

Patented Dec. 22, 1931

1,837,625

UNITED STATES PATENT OFFICE

HARRY H. McKEE AND CHARLES T. WALTER, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

VENDING DEVICE

Application filed August 22, 1929. Serial No. 387,614.

This invention relates to methods and means for retail merchandising, and is directed especially to refrigeration, and to convenience in displaying and dispensing the goods.

The main objects of the invention are to provide methods and means whereby meat supplies of various kinds may be delivered from the packers either in standardized package form or in bulk direct to the retailer in a form convenient for dispensing to the customers; to provide a refrigerating and dispensing device adapted to assure proper temperature control of the meat and also facilitate rapid and economical dispensing of the meats either in standardized pre-wrapped parcels or in locally prepared parcels; to provide a meat retailing method adapted for ready selection of goods and self-service by the customer consistently with maximum conservation of the desired refrigeration conditions in the dispensing device; to provide such device adapted to accommodate self-service, as well as personal service by the retailer or his clerks, with respect to goods not adapted for standardized package merchandising or prewrapping.

An illustrative embodiment of this invention is shown in the accompanying drawings, in which:

Figure 1 is a plan of a vertically disposed cylindrical dispensing fixture, part of which is broken away on the line 1—1 of Fig. 2.

Fig. 2 is mainly a front elevation of the device of Fig. 1 with the right hand part shown in vertical section on the line 2—2 of Fig. 1.

Fig. 3 is a greatly enlarged front elevation of a limited portion of the device shown in Figs. 1 and 2.

Fig. 4 is an enlarged detail partly in section showing one of the automatic door closing, power-operated friction hinges.

Fig. 5 is a section on the line 5—5 of Fig. 4.

Fig. 6 is a plan substantially similar to Fig. 1 except that only a small part of the casing is removed to show the refrigerating coils.

Fig. 7 is a vertical section taken on line 7—7 of Fig. 3.

In the construction shown in the drawings the store fixture or vending cabinet is of upright, cylindrical shape, and comprises mainly a combined frame and wall part or shell 2, having dispensing doors 3 therein, compartments 4 to receive the goods 5 from which the customers are to select, a refrigerating device 6, refrigerating coils 7 connected thereto, power operated fans 8 to circulate the air in said fixture, automatic means driven by a motor 9 to close the doors 3, storage receptacles 10 to receive supplies of goods in quantity from the packers and a door 11 to admit an attendant.

In using this device the drawers 10 are replenished from time to time, as for instance daily. The wholesaler or packing house agent delivers pre-wrapped package goods and also meat in bulk if desired, into the compartments 10. Then the local attendant or clerk, who may be stationed either continuously or periodically within the central compartment 2', transfers goods from the drawers 10 to the compartments 4 from time to time, according to the rate at which they are dispensed to customers, and so that the retailing compartments may never become entirely empty.

In order to supply the needs of customers desiring meats which are not adapted for pre-cutting or standardized package use, a chopping block or cutting table and other necessary equipment (not shown) may be supplied for use by the attendant or clerk in charge of the device.

This may be located either adjoining the device, or within those having a large sized cabinet. It is intended that such special orders may be conveniently filled by such attendant from appropriate stock in certain of the drawers 10, in which the goods are of the same general kind selected by the customer and shown in the corresponding display part of the device.

The automatic doors 3 are carried by hinges 12, each of special friction design and connected with the source of power 9. The construction of the hinges is illustrated in Figs. 3, 4 and 5. The hinge here shown comprises two leaves 13 and 14, one being fixed to the shell 2 and the other to the door 3. All of the hinges for a vertical line of doors have a common pintle shaft 15 which is connected through a common drive connecting chain and a reducing gear mechanism 16 to said motor 9. Each hinge includes a pair of washers 17, keyed to the shaft 15, and an helical compression spring 18 bearing against said washers, whereby the latter are held frictionally against the inner sides of the two arms 19 of the movable hinge leaf 14. The pintle shafts 15 are all caused to rotate in a direction to close the doors 3, as, for example, in a counter-clockwise direction as viewed from the top. The hinge leaf 13 has a sleeve part 13' which encloses the pintle shaft 15 and spring 18.

Each shaft 15 is provided at its top with a gear 20 fixed thereon and these gears are all connected by a driving chain 21 which in turn is driven by motor 9 through said reducing gear.

Each door 3 includes a glass panel 3' through which the goods may be inspected. In order to assure adequate illumination of the goods, each door is provided on its upper edge with a lamp fixture 22 having a lamp 23, a reflector 24 and also preferably having a display portion 24' adapted to receive an appropriate title or legend describing the goods.

When a customer has inspected the goods and finds what he desires in the display, he grasps one of the door handles 25 and pulls open the corresponding door 3, whereupon he may readily take one or more packages which may be placed in a basket or other receptacle, such as used in self-service stores. Before leaving the store the purchaser passes a checker and cashier, where payment or adjustment is made for the purchases.

As soon as the door 3 is released by the customer, it is automatically closed gradually, by the continuously rotating shaft 15, slowly enough to avoid slamming, but with sufficient speed to prevent too much change of temperature within the compartment 4.

The fans 8 drive chilled air downward from the overlying coils 7 through the display sections 4, which have mesh bottoms 26, whereby the meats are maintained at a uniform constant predetermined temperature.

Although but one general embodiment of the device comprised by this invention is actually shown, it will be understood that details both as to the method and means for carrying out the invention, may be modified or omitted without departing from the spirit of this invention as defined by the following claims:

We claim:

1. A self-service vending device comprising a housing having a door of sufficient size to admit an attendant, supply receptacles therein to receive goods in quantity, dispensing receptacles arranged adjacent the inner wall of said housing and adapted to receive comparatively small quantities of goods, a plurality of dispensing receptacle door openings in said housing each provided with a door giving customers access to the goods within said dispensing receptacle, and continuously acting power operated means tending to gradually close the dispensing receptacle doors without interfering with the opening of the same by the customers.

2. A self-service vending device comprising a housing provided with a plurality of compartments to receive goods and having doors located at the walls of the compartments and provided with transparent portions to expose the contents of the compartments and to protectively insulate the contents, and continuously operating power actuating means tending to gradually close the doors without interfering with the independent and individual opening of the same.

3. A self-service vending device comprising a cabinet provided with a plurality of groups of compartments to receive goods, the compartments of each group being arranged in a vertical series and having hinged doors located at the walls of the compartments, the doors of each group having a common pintle, continuously operating power actuating means connected with the pintles of the groups of doors for simultaneously and continuously rotating the same to gradually close the doors, and means for operatively connecting the doors with the pintle to permit independent and individual opening of the doors without affecting the continuous operation of the power operating means.

4. A self-service vending device comprising a cabinet provided with a plurality of groups of compartments to receive goods, the compartments of each group being arranged in a vertical series and having hinged doors, the doors of each group having a common pintle, continuously operating power actuating means including door connecting gearing composed of gears mounted on the said pintles and an endless chain meshing with each of the gears and a motor having a gear operatively connected with the said gearing, and means for operatively connecting the doors with the pintles to permit independent and individual opening of the doors without affecting the continuous operation of the power actuating means.

5. A self-service vending device comprising a cabinet provided with a plurality of groups of compartments to receive goods, the compartments of each group being arranged in a vertical series and having hinged doors located at the walls of the cabinet, the doors of each group having a common pintle, continuously operating power actuating means including sprocket wheels mounted on the pintles and an endless sprocket chain meshing with the said sprocket wheels and a motor having a gear meshing with one of the said sprocket wheels.

6. A self-service vending device comprising a cabinet provided with a plurality of groups of compartments to receive goods, the compartments of each group being arranged in a vertical series and having hinged doors, the doors of each group having a common pintle and provided with eyes arranged on the pintle, continuously operating power actuating means connected with the pintles of the groups of doors for simultaneously and continuously rotating the same to gradually close the doors, and friction devices carried by the pintles and engaging the eyes of the doors for operatively connecting the doors with the pintles to permit independent and individual opening of the doors without affecting the continuous operation of the power actuating means.

7. A self-service vending device comprising a cabinet provided with a plurality of groups of compartments to receive goods, the compartments of each group being arranged in a vertical series and having hinged doors, the doors of each group having a common pintle and provided with spaced eyes arranged on the pintle, continuously operating power actuating means connected with the pintles of the groups of doors for simultaneously and continuously rotating the same to gradually close the doors, pairs of spaced washers keyed to each pintle, and a coiled spring interposed between each pair of spaced washers for maintaining the same in frictional engagement with the eyes of the doors to permit independent and individual opening of the doors without affecting the continuous operation of the power actuating means.

Signed at Chicago this 19th day of August, 1925.

HARRY H. McKEE.
CHARLES T. WALTER.